(12) United States Patent
Hamama et al.

(10) Patent No.: US 8,608,374 B2
(45) Date of Patent: Dec. 17, 2013

(54) OUTSIDE AIR TEMPERATURE SENSOR DIAGNOSTIC SYSTEMS FOR A VEHICLE

(75) Inventors: Wajdi B. Hamama, Whitmore Lake, MI (US); Layne K. Wiggins, Plymouth, MI (US); Wenbo Wang, Novi, MI (US); Robert J. Horner, Dexter, MI (US); John F. Van Gilder, Webberville, MI (US); Keith M. Lindsey, Jr., Novi, MI (US); Robert D. Wagner, Eaton Rapids, MI (US)

(73) Assignee: GM Global Technology Operations LLC

( * ) Notice: Subject to any disclaimer, the term of this patent is extended or adjusted under 35 U.S.C. 154(b) by 314 days.

(21) Appl. No.: 12/903,515

(22) Filed: Oct. 13, 2010

(65) Prior Publication Data
US 2012/0051388 A1     Mar. 1, 2012

Related U.S. Application Data

(60) Provisional application No. 61/377,615, filed on Aug. 27, 2010.

(51) Int. Cl.
*G01K 3/00* (2006.01)
*G01K 13/00* (2006.01)
*G01K 15/00* (2006.01)

(52) U.S. Cl.
USPC ........... 374/109; 374/144; 374/145; 374/112; 374/1

(58) Field of Classification Search
USPC .............................. 374/109, 144, 145, 112, 1
See application file for complete search history.

(56) References Cited

U.S. PATENT DOCUMENTS

| | | | |
|---|---|---|---|
| 5,995,887 A * | 11/1999 | Hathaway et al. | 701/30.1 |
| 2007/0033998 A1 * | 2/2007 | Wakahara et al. | 73/118.1 |
| 2007/0073509 A1 * | 3/2007 | Rahman et al. | 702/130 |
| 2009/0078033 A1 * | 3/2009 | Iwai | 73/114.34 |
| 2010/0195693 A1 * | 8/2010 | Kitajima | 374/1 |

* cited by examiner

*Primary Examiner* — Mirellys Jagan (57) ABSTRACT

An outside air temperature (OAT) diagnostic system includes an ambient temperature monitoring module that receives (i) an OAT signal from an OAT sensor and (ii) an intake air temperature (IAT) signal from an IAT sensor of an engine. The ambient temperature monitoring module compares the OAT signal to an IAT signal and generates a first difference signal. A performance reporting module determines whether the OAT sensor is exhibiting a fault and generates an OAT performance signal based on the first difference signal.

15 Claims, 7 Drawing Sheets

OUTSIDE AIR TEMPERATURE SENSOR DIAGNOSTIC SYSTEMS FOR A VEHICLE

CROSS-REFERENCE TO RELATED APPLICATIONS

This application claims the benefit of U.S. Provisional Application No. 61/377,615, filed on Aug. 27, 2010. The disclosure of the above application is incorporated herein by reference in its entirety.

FIELD

The present disclosure relates to outside air temperature systems of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Onboard diagnostic (OBD) controllers (i.e. diagnostic controllers on a vehicle) need to satisfy certain regulations and manufacturer requirements. For example, the OBD controllers are required to perform diagnostic tests on received signals. The diagnostic tests are performed to determine whether the signals pass or fail predetermined requirements. A malfunction indicator lamp (MIL) is illuminated, for example, when a fault is detected.

An outside air temperature (OAT) sensor system is used to report ambient air temperatures. The OAT system includes an OAT sensor that detects ambient air temperature. Information provided by the OAT sensor is provided to a non-OBD compliant controller, for use by various vehicle systems. As information from the OAT sensor system is not OBD compliant, the information can not be provided to and used by an OBD compliant controller.

SUMMARY

An outside air temperature (OAT) diagnostic system is provided and includes an ambient temperature monitoring module. The ambient temperature monitoring module receives (i) an OAT signal from an OAT sensor and (ii) an intake air temperature (IAT) signal from an IAT sensor of an engine. The ambient temperature monitoring module compares the OAT signal to an IAT signal and generates a first difference signal. A performance reporting module determines whether the OAT sensor is exhibiting a fault and generates an OAT performance signal based on the first difference signal.

In other features, an OAT diagnostic system is provided and includes an ambient temperature monitoring module that receives an OAT signal from an OAT sensor of a vehicle. The OAT diagnostic system further includes at least one of (i) an out-of-range high and low module that generates a first fault pending signal based on the OAT signal and a first OAT limit and (ii) an intermittent fault module that generates a second fault pending signal based on an intermittent count and an intermittent maximum. A count module increments one of a first pass count and a first fail count based on at least one of the first fault pending signal and the second fault pending signal. A monitoring module determines whether the OAT sensor is exhibiting a fault based on at least one of the first pass count and the first fail count.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Information from traditional outside air temperature (OAT) systems is not onboard diagnostic (OBD) compliant. As an alternative to OAT information, intake air temperature (IAT) of an engine has been used to indirectly estimate OAT. IAT information is OBD compliant, as diagnostic testing and evaluating of IAT information is performed.

An IAT sensor may be located on or near an intake manifold of an engine and detects temperature of air entering the engine. Although the IAT sensor may be used to provide an estimate of OAT, the estimate can be inaccurate. Also, as the IAT is located on the engine (or in an engine compartment), response time of the IAT sensor is slower than response time of an OAT sensor to changes in outside temperature. For example, temperature of air entering the engine can change at a slower rate than ambient temperature due to temperature of the engine. Temperature of the engine affects temperature in the engine compartment and thus IAT. As a result, IAT sensor response time is affected by changes in engine temperature. In addition, thermal energy from the engine tends to heat the air prior to entering the engine, which affects output of the IAT sensor.

An OAT sensor may be located away from the engine and thus may not be affected by thermal energy emitted from the engine as much as an IAT sensor. As an example, an OAT sensor may be located on a front bumper or grille of a vehicle forward of an engine and outside of an engine compartment. This allows the OAT sensor to detect ambient air temperature while being minimally affected by thermal energy emitted from an engine. The IAT sensor thus does not cool down as quickly as the OAT sensor when an engine is deactivated (turned OFF). As a result, ambient information from the OAT sensor is more accurate over a larger range of temperatures than estimates generated from IAT information.

The following disclosure provides OAT diagnostic systems and methods for diagnosing an OAT sensor. This allows the OAT information generated by an OAT sensor to be OBD compliant. As ambient temperature information received from an OAT sensor is more accurate and has a quicker response time than ambient temperature estimations generated based on IAT information, performance of various OAT dependent vehicle systems can be improved. OAT dependent vehicle systems refer to vehicle systems that use OAT information when performing decisions, calculations, modeling estimations, etc. Examples of OAT dependent vehicle systems are provided below.

Figure 1:
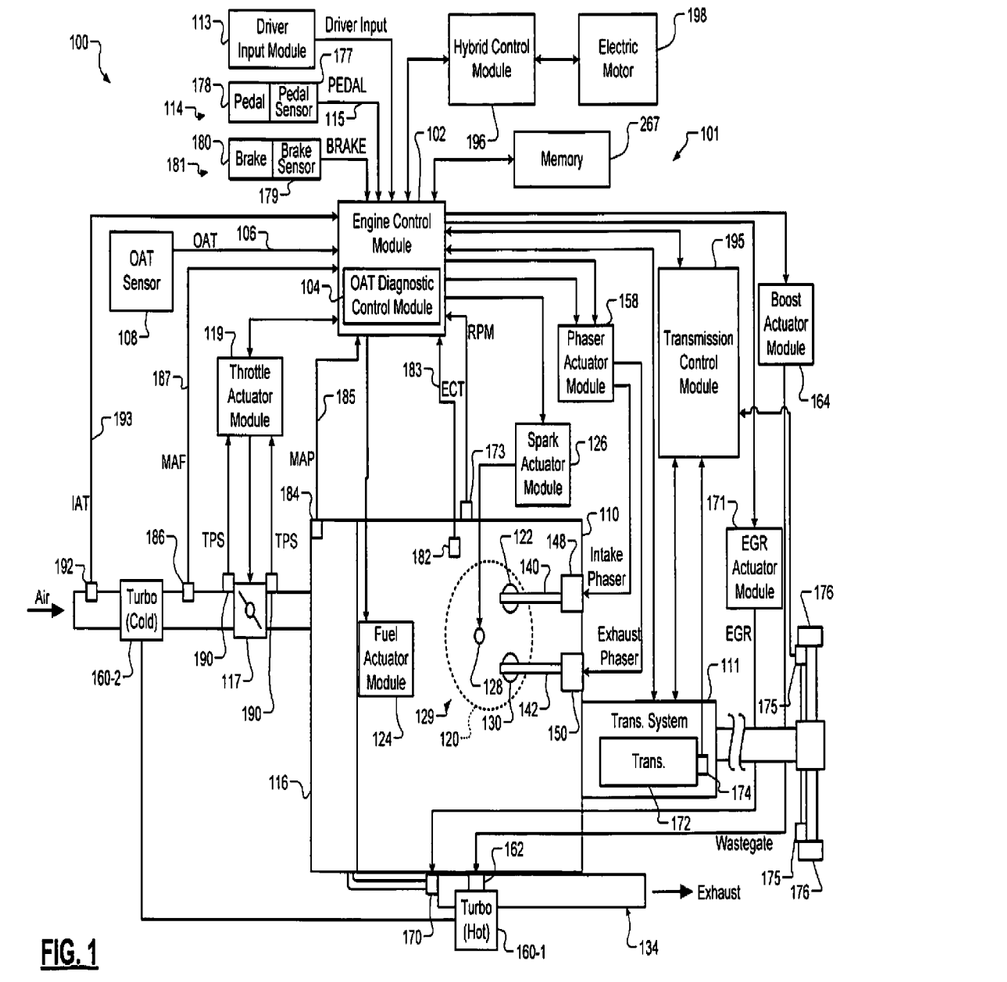
FIG. 1 is a functional block diagram of a vehicle control system incorporating an outside air temperature (OAT) diagnostic system in accordance with the present disclosure.

In FIG. 1, a functional block diagram of an exemplary vehicle control system 100 is shown. The vehicle control system 100 includes an OAT diagnostic system 101. Although in FIG. 1, the OAT diagnostic system 101 is applied to a hybrid powertrain system, the OAT diagnostic system 101 may be applied to non-hybrid and/or electric powertrain systems. An electric powertrain system refers to a powertrain system that includes one or more electric motors and does not include an internal combustion engine.

The OAT diagnostic system 101 includes an engine control module (ECM) 102 (e.g., OBD compliant controller), which includes an OAT diagnostic control module 104. The OAT diagnostic control module 104 receives an ambient air temperature (or OAT) signal OAT 106 from an OAT sensor 108. The OAT signal OAT 106 may, for example, indicate resistance of the OAT sensor 108. The OAT sensor 108 may be a variable resistance temperature sensor. The resistance may be directly related to ambient air temperature. The ambient air temperature may be converted to a resistance by the OAT sensor 108. The ECM 102, and/or the OAT diagnostic control module 104 may convert the resistance back to an ambient temperature value. The OAT diagnostic system 101 performs diagnostic test methods on the OAT sensor 108. The diagnostic tests allow OAT signals to be OBD compliant.

The OAT diagnostic test methods are performed in a real-time control environment (i.e. performed in-vehicle with engine running (activated) and/or with the engine OFF (deactivated)). This allows OAT signals from the OAT sensor 108 to be used for control, display and diagnostic test purposes. The diagnostic test methods may be referred to as a performance test method, an out-of-range high test method, an out-of-range low test method, and an intermittent signal test method. The performance, out-of-range, and intermittent test methods are described with respect to FIGS. 3A-6 below.

The performance test method is used to detect when the OAT signal from the OAT sensor 108 is skewed higher or lower than the OAT signal should be for a current condition. For example, a fault may be indicated when the OAT signal is greater than or less than a predetermined or estimated temperature for a current condition by a predetermined amount.

The out-of-range high and out-of-range low test methods are used to detect a circuit of the OAT sensor 108 that is open, shorted to ground, shorted to a source voltage (e.g., a source voltage greater than or equal to 5V), etc.

The intermittent signal test method is used to detect an unstable OAT signal. An unstable OAT signal refers to an OAT signal that changes more frequently than expected for a time period. For example only, a fault may be generated when the accumulated OAT signal changes (or an integral of OAT signal change over time is) more than 20° over a 10 second period.

The OAT diagnostic control module 104 may also perform figure-of-merit (FOM) tracking and determine in-use rates. FOM tracking is used to determine a degree of robustness of the OAT diagnostic system 101 to false fails and false passes. FOM tracking monitors how close the OAT sensor 108 and/or a corresponding OAT detection system comes to false failing and/or false passing one or more diagnostic tests. A false fail may refer to when the OAT diagnostic system 101 falsely indicates that the OAT signal failed a test, but in actuality the OAT signal did not fail the test. A false pass may refer to when the OAT diagnostic system 101 falsely indicates that the OAT signal passed a test, but in actuality the OAT signal did not pass the test.

The in-use-rates may indicate how often each of the OAT diagnostic test methods is performed and/or how often each of the OAT diagnostic test methods provides a fail or pass result. An in-use-rate may include a numerator and a denominator. The numerator may indicate the number of drive cycles that a diagnostic test is performed and/or that a diagnostic test result is provided. The denominator may indicate: number of drive cycles that the engine 110 is running; number of drive cycles that the OAT sensor is activated and/or used; total number of drive cycles; and/or number of times the vehicle control system is activated. A drive cycle may refer to, for example, a period between a "key ON" and a "key OFF" of a vehicle. The OAT diagnostic control module 104 may track in-use-rates for each of the test methods described herein.

The vehicle control system 100 further includes an engine 110 and a transmission system 111. OAT dependent vehicle systems of the engine 110 and/or transmission system 111 may operate based on OAT signals from the OAT sensor 108. The OAT dependent vehicle systems may be control systems and/or diagnostic systems. Example OAT dependent vehicle systems are: an evaporative emissions control (EVAP) system; an engine coolant temperature rationality (ECTR) system; a high-sided coolant rationality (HSCR) system; a heating, ventilating and air conditioning (HVAC) system; an emissions or start of injection (SOI) system; an auxiliary pump control system; a hybrid vehicle system; a positive crankcase ventilation (PCV) system; etc.

An EVAP system maintains predetermined pressures in a fuel tank without allowing fuel vapors to escape to atmosphere. An ECTR system determines whether engine coolant temperature sensor information is skewed low or a thermostat is stuck in an open position. A HSCR system determines whether engine coolant temperature sensor information is skewed high. An HVAC system may be used to control temperature within a passenger compartment of a vehicle. An emissions or SOI system may be used to control emissions of an engine.

An auxiliary pump control system may be used to pump fluids in a transmission during cold conditions to prevent lock-up of transmission components. A hybrid vehicle system may include electric motors and an engine, which is activated and deactivated. As an example, OAT information (i.e. information provided by the OAT signals) may be used to improve fuel economy in hybrid vehicle systems due to reduced auxiliary pump ON time. Since OAT information is used, IAT inaccuracies may no longer need to be accounted for when operating an auxiliary pump, which reduces auxiliary pump ON time. A PCV system may be used to flow air out of a crankcase. As another example, OAT information may be used to prevent freezing of a PCV line.

OAT information may be provided to powertrain, body, and chassis control modules where OAT information may be used for preconditioning, vehicle starting, engine cycling conditions, etc. The OAT information may be used to determine fuel quantities, for EGR control, for boost control, for estimating soot loading, etc. Other example OAT dependent vehicle systems are provided below.

The engine 110 combusts an air/fuel mixture to produce drive torque for a vehicle based on a driver input from a driver input module 113 and/or from an accelerator pedal system 114. The accelerator pedal system 114 may generate an accelerator signal PEDAL 115. Air is drawn into an intake manifold 116 through a throttle valve 117. For example only, the throttle valve 117 may include a butterfly valve having a rotatable blade. The ECM 102 controls a throttle actuator module 119, which regulates opening of the throttle valve 117 to control the amount of air drawn into the intake manifold 116. Air from the intake manifold 116 is drawn into cylinders of the engine 110. While the engine 110 may include any number of cylinders, for illustration purposes a single representative cylinder 120 is shown.

During the intake stroke, air from the intake manifold 116 is drawn into the cylinder 120 through an intake valve 122. The ECM 102 controls a fuel actuator module 124, which regulates fuel injection to achieve a desired air/fuel ratio. Fuel may be injected into the intake manifold 116 at a central location or at multiple locations, such as near the intake valve 122 of each of the cylinders. In various implementations (not shown), fuel may be injected directly into the cylinders or into mixing chambers associated with the cylinders.

The injected fuel mixes with air and creates an air/fuel mixture in the cylinder 120. During a compression stroke, a piston (not shown) within the cylinder 120 compresses the air/fuel mixture. The engine 110 may be a compression-ignition engine, in which case compression in the cylinder 120 ignites the air/fuel mixture. Alternatively, the engine 110 may be a spark-ignition engine. A spark actuator module 126 may be used to energize a spark plug 128 of an ignition system 129 in the cylinder 120 based on a signal from the ECM 102, which ignites the air/fuel mixture. During an exhaust stroke, the piston begins to move and expel the byproducts of combustion through an exhaust valve 130. The byproducts of combustion are exhausted from the vehicle via an exhaust system 134.

The intake valve 122 may be controlled by an intake camshaft 140. The exhaust valve 130 may be controlled by an exhaust camshaft 142. In various implementations, multiple intake camshafts (including the intake camshaft 140) may control multiple intake valves (including the intake valve 122) for the cylinder 120 and/or may control the intake valves (including the intake valve 122) of multiple banks of cylinders (including the cylinder 120). Similarly, multiple exhaust camshafts (including the exhaust camshaft 142) may control multiple exhaust valves for the cylinder 120 and/or may control exhaust valves (including the exhaust valve 130) for multiple banks of cylinders (including the cylinder 120).

The time at which the intake valve 122 is opened may be varied with respect to piston position by an intake cam phaser 148. The time at which the exhaust valve 130 is opened may be varied with respect to piston position by an exhaust cam phaser 150. A phaser actuator module 158 may control the intake cam phaser 148 and the exhaust cam phaser 150 based on signals from the ECM 102.

The vehicle control system 100 may include a boost device that provides pressurized air to the intake manifold 116. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 117. In various implementations, a supercharger (not shown), driven by a crankshaft of the engine 110, may compress air from the throttle valve 117 and deliver the compressed air to the intake manifold 116.

A wastegate 162 may allow exhaust to bypass the turbine 160-1, thereby reducing the boost (the amount of intake air compression) of the turbocharger. The ECM 102 may control the turbocharger via a boost actuator module 164. The boost actuator module 164 may modulate the boost of the turbocharger by controlling the position of the wastegate 162.

The vehicle control system 100 may include an exhaust gas recirculation (EGR) valve 170, which selectively redirects exhaust gas back to the intake manifold 116. The EGR valve 170 may be located upstream of the turbocharger's turbine 160-1. The EGR valve 170 may be controlled by an EGR actuator module 171.

Torque output of the engine 110 is provided to the transmission system 111. The transmission system 111 may include a transmission 172. The transmission 172 may be an automatic transmission, a dual clutch transmission, an electro-hydraulic controlled transmission, a manual transmission, etc. A dual clutch transmission includes a first clutch for a first set of gears (e.g., odd gears) and a second clutch for a second set of gears (e.g., even gears).

Sensors

The vehicle control system 100 includes various sensors. The vehicle control system 100 may include an engine speed sensor 173, a transmission speed sensor 174 and wheel speed sensors 175. The sensors 173, 174, 175 may be used to estimate speed of the vehicle. The engine speed sensor 173 is used to detect speed of the crankshaft of the engine 110 in revolutions-per-minute (rpm). The wheel speed sensors 175 may be used to detect speeds of driven wheels 176 of the vehicle and/or vehicle speed Vspd.

The vehicle control system 100 may further include an accelerator pedal sensor 177 that detects position of an accelerator pedal 178 of the accelerator pedal system 114. The accelerator pedal sensor 177 generates the pedal position signal PEDAL 115. A brake pedal sensor 179 may detect position of a brake pedal 180 of a braking system 181 and generate a brake pedal signal BRAKE.

An engine coolant temperature (ECT) sensor 182 may also be included and used to detect temperature of a coolant of the engine 110 and to generate an ECT signal ECT 183. Pressure within the intake manifold 116 may be measured using a manifold absolute pressure (MAP) sensor 184. The MAP sensor 184 may be used to generate a MAP signal MAP 185. Mass flow rate of air flowing into the intake manifold 116 may be measured using a mass air flow (MAF) sensor 186. The MAF sensor 186 may be used to generate a MAF signal MAF 187.

The throttle actuator module 119 may monitor the position of the throttle valve 117 using one or more throttle position sensors (TPS) 190. The ambient temperature of air being drawn into the engine 110 may be measured using an intake air temperature (IAT) sensor 192. The IAT sensor 192 may be used to generate an IAT signal IAT 193. The ECM 102 may use signals from the sensors to make control decisions for the vehicle control system 100.

The ECM 102 may communicate with a transmission control module 195 to coordinate shifting gears in the transmission 172. For example, the ECM 102 may reduce engine torque during a gear shift. The ECM 102 may communicate with a hybrid control module 196 to coordinate operation of the engine 110 and an electric motor 198.

The electric motor 198 may also function as a generator, and may be used to produce electrical energy for use by vehicle electrical systems and/or for storage in a battery. Various implementations and functions of the transmission control module 195, the ECM 102, and the hybrid control module 196 may be integrated into one or more modules.

Figure 2:
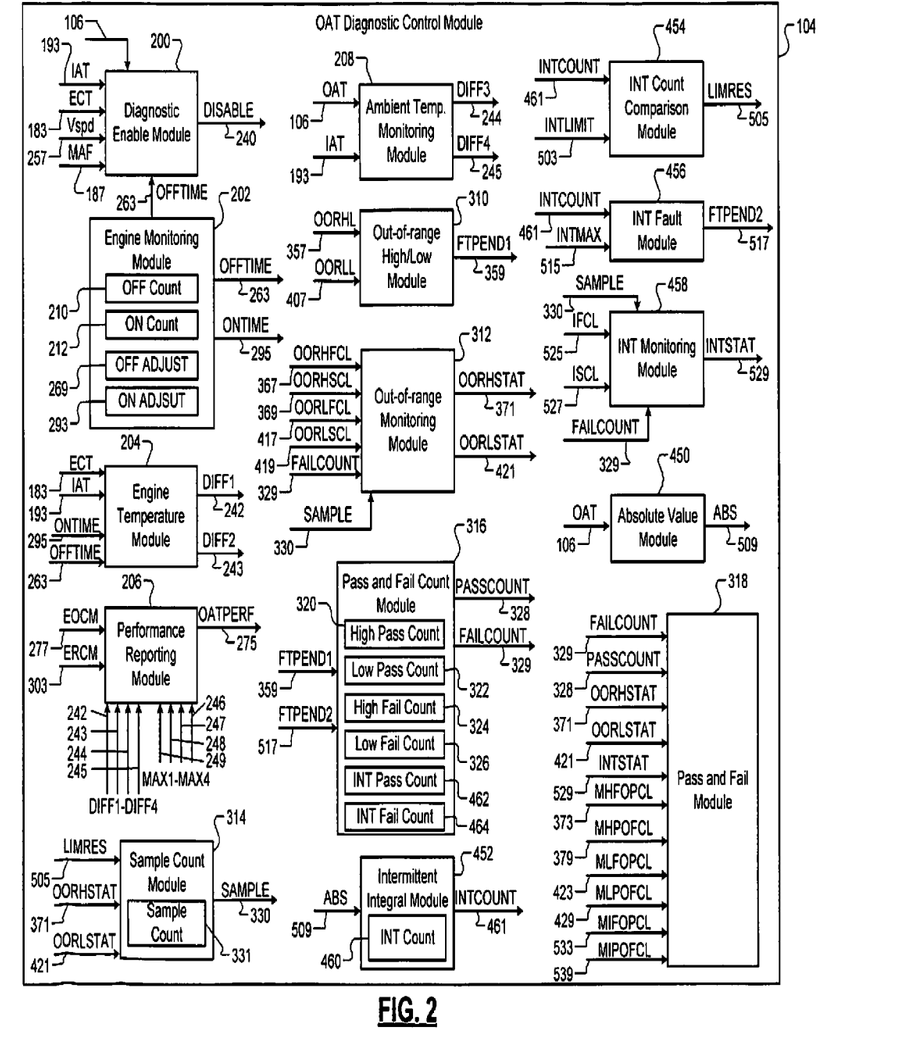
FIG. 2 is a functional block diagram of an OAT diagnostic control module in accordance with the present disclosure.

Referring now also to FIG. 2, the OAT diagnostic control module 104 is shown. The OAT diagnostic control module 104 includes various modules, which may be used to perform one or more of the OAT diagnostic test methods. The modules of the OAT diagnostic control module 104 may be part of the ECM 102 and/or part of the OAT diagnostic control module 104, as shown. The OAT diagnostic control module 104 includes a diagnostic enable module 200, an engine monitoring module 202, an engine temperature module 204, a performance reporting module 206, and an ambient temperature monitoring module 208. The engine monitoring module 202 stores an OFF (drive) count 210 and an ON (drive) count 212, which indicate OFF time (time the engine 110 is deactivated) and ON time (time the engine 110 is activated).

Figure 3A:
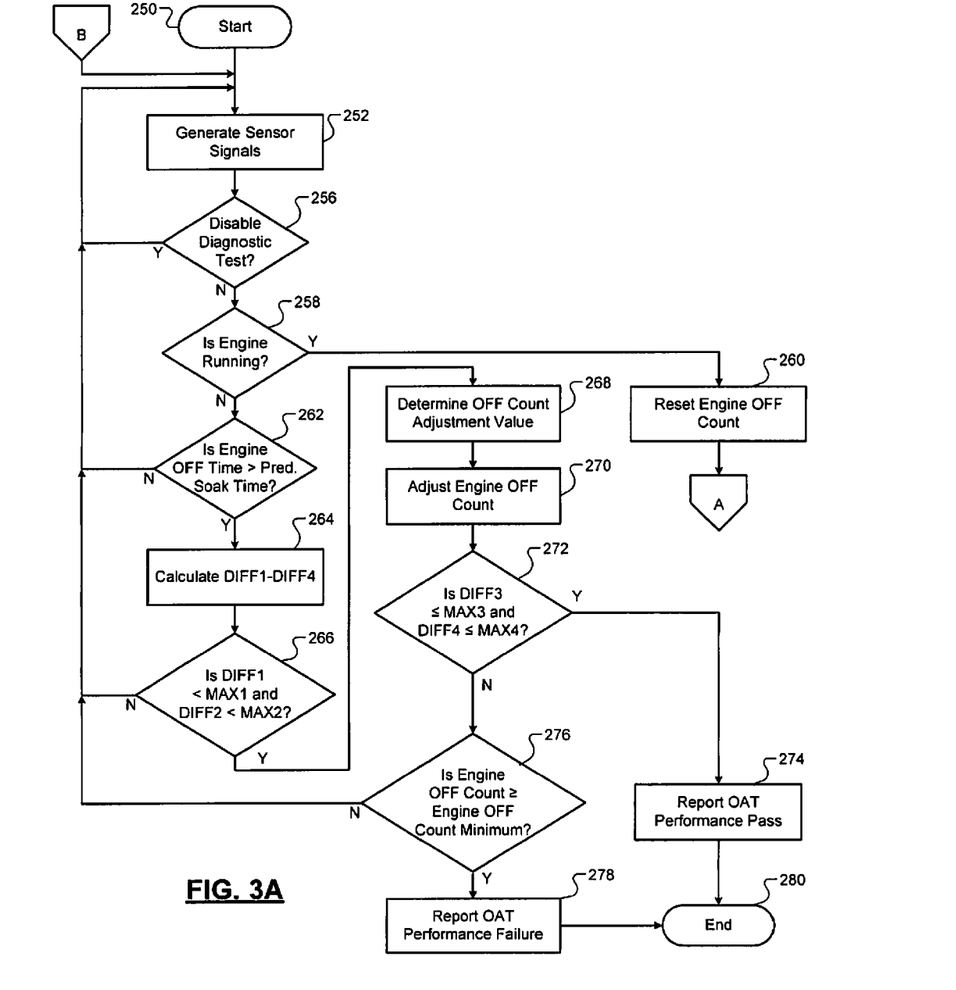
FIGS. 3A and 3B illustrate a performance test method in accordance with the present disclosure.
Figure 3B:
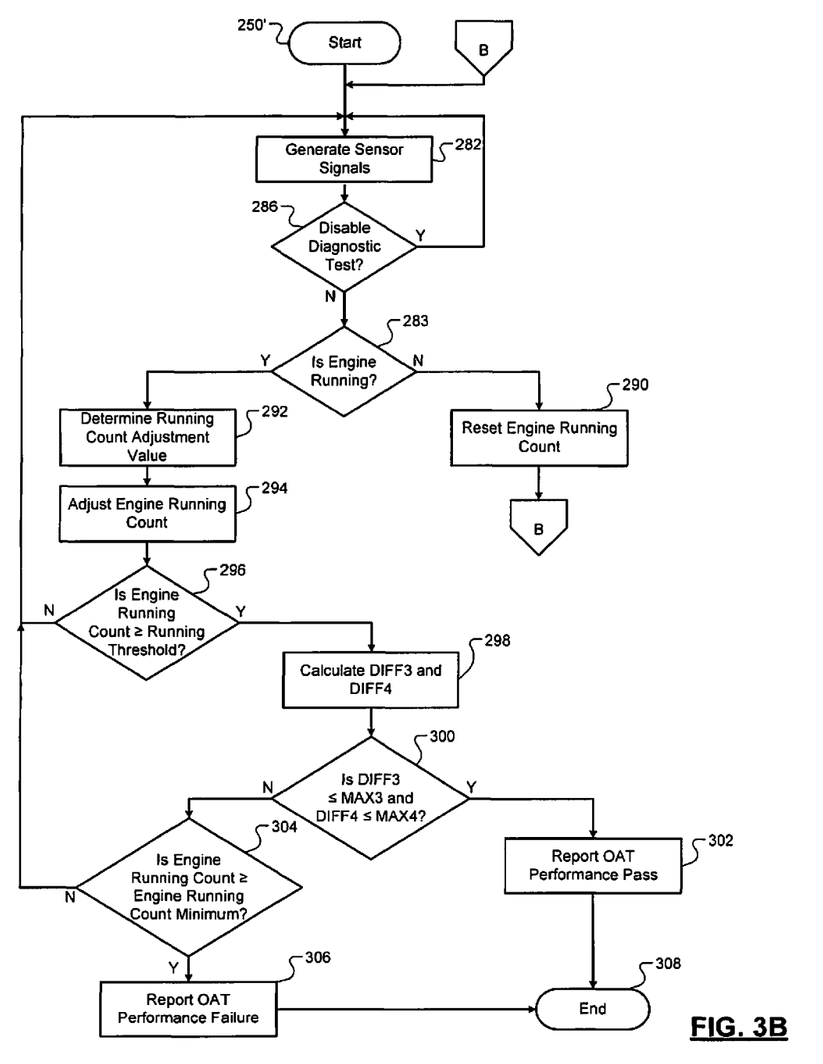

Referring now also to FIGS. 3A and 3B, a performance test method is shown. Although the following tasks are primarily described with respect to the implementations of FIGS. 1 and 2, the tasks may be easily modified to apply to other implementations of the present disclosure. The tasks may be iteratively performed and may begin at 250 or 250' depending on whether the engine 110 is running. The tasks may be performed once per drive cycle.

The test method may begin at 250 when the engine 110 is OFF (engine OFF mode). Tasks 252-280 are performed during the engine OFF mode. The test method may begin at 250' when the engine 110 is ON (engine ON or running mode). Tasks 282-308 are performed during the engine ON mode. During the engine OFF mode, a detected ECT and a detected IAT are compared, as temperature of the engine 110 may be less than the IAT by more than a predetermined amount.

During the engine ON mode, ECT increases and is not compared with an IAT. Engine OFF time is also not used during the engine ON mode. During the engine ON mode, the OAT diagnostic control module 104 waits a predetermined period to allow temperatures of the OAT and IAT sensors 108, 192 to equalize. During this period the engine 110 flows air across the IAT sensor and the vehicle moves at least at a certain speed to cool down the OAT sensor. If after the predetermined period the OAT and IAT sensor values are within a predetermined difference of each other, then a pass is reported, otherwise a failure is reported. This is further described below.

Counts may be initiated or reset to zero at 250 and/or 250'. For example, the OFF count 210 and the ON count 212 may be reset to zero. At 252, sensor signals are generated. The sensor signals may include signals from the sensors 108, 182, 186, 192, 175, and/or other sensors of the vehicle control system 100 and/or the OAT diagnostic system 101.

At 256, the diagnostic enable module 200 determines if a disable condition exists based on the sensor signals, faults associated with the sensor signals, and/or based on other faults. During the engine OFF mode, the diagnostic enable module 200 checks periodically (e.g., every 100 milliseconds) if there are any disabling fault codes that may cause an OAT diagnostic test to be aborted. For example, the diagnostic enable module 200 may determine that a disable condition exits when there is a fault with one or more of the sensor signals OAT 106, ECT 183, MAF 187, IAT 193, Vspd (257). The diagnostic enable module 200 may also determine if a disable condition exists based on a fault with an engine OFF time, as determined by the engine monitoring module 202.

The diagnostic enable module 200 may generate a diagnostic disable signal DISABLE 240 when a disable condition exists. Although not shown in FIG. 2, the disable signal DISABLE 240 may be provided to and disable one or more of the modules of the OAT diagnostic control module 104. Task 258 is performed when a disable condition does not exist.

At 258, the engine monitoring module 202 determines whether the engine 110 is running. The engine may be running, for example, when fuel and spark of the engine are enabled. Task 260 is performed when the engine is running, otherwise task 262 is performed.

At 260, the engine monitoring module 202 resets the engine OFF count 210 to zero. Task 252 may be performed after task 260.

At 262, the engine monitoring module 202 determines whether engine OFF time 263 (the engine OFF count 210) is greater than a predetermined soak time. In other words, the engine monitoring module 202 determines whether the engine 110 has been OFF for a predetermined period resulting in a "cold" engine. Task 264 is performed when the engine OFF time 263 is greater than the predetermined soak time, otherwise task 252 is performed.

At 264, the engine temperature module 204 and the ambient temperature monitoring module 208 calculates differences DIFF1-DIFF4 (242-245) based on the OAT signal OAT 106, the ECT signal ECT 183, and the IAT signal IAT 193. The engine temperature module 204 may determine DIFF1 and DIFF2 according to equations 1 and 2. The temperature monitoring module 208 may determine DIFF 3 and DIFF 4 according to equations 3 and 4.

$$DIFF1 = ECT - IAT \qquad (1)$$

$$DIFF2 = IAT - ECT \qquad (2)$$

$$DIFF3 = OAT - IAT \qquad (3)$$

$$DIFF4 = IAT - OAT \qquad (4)$$

At 266, the performance reporting module 206 determines (i) whether the first difference DIFF1 is less than a first maximum value MAX1 (246) and (ii) whether the second difference DIFF2 is less than a second maximum value MAX2 (247). The maximum values MAX1 and MAX2 may be predetermined values and stored in memory 267 (shown in FIG. 1). Task 266 is used to check if the detected ECT is within a predetermined range of the detected OAT. Task 268 is performed when (i) the first difference DIFF1 is less than the first maximum value MAX1 and (ii) the second difference DIFF2 is less than the second maximum value MAX2, otherwise task 252 is performed.

At 268, the engine monitoring module 202 determines an OFF count adjustment value ADJUST 269 based on the vehicle speed Vspd 257. The engine monitoring module 202 may determine the OFF count adjustment value ADJUST 269 using a table or algorithm stored in the memory 267. At 270, the engine monitoring module 202 increments or decrements the engine OFF count 210 based on the OFF count adjustment value ADJUST 269.

At 272, the performance reporting module 206 determines (i) whether the third difference DIFF3 is less than or equal to a third maximum value MAX3 (248) and (ii) whether the fourth difference DIFF4 is less than or equal to a fourth maximum value MAX4 (249). The maximum values MAX3 and MAX4 may be predetermined values and stored in memory 267 (shown in FIG. 1). In performing tasks 264-272, the OAT diagnostic control module 104 determines whether a vehicle has moved more than a certain distance and/or faster than a certain speed such that the detected OAT and IAT have decreased. If (i) the vehicle has moved more than a predetermined distance and/or faster than a predetermined speed and (ii) difference between the detected OAT and IAT is greater than a predetermined amount, then a failure is reported at 278.

Task 274 is performed when (i) the third difference DIFF3 is less than or equal to the third maximum value MAX3 and (ii) the fourth difference DIFF4 is less than or equal to the fourth maximum value MAX4, otherwise task 276 is performed. At 274, the performance reporting module 206 reports via an OAT performance signal OATPERF 275 an OAT performance pass, which may be stored in the memory 267. This indicates that the OAT signal 106 is not skewed high or low relative to an estimated OAT. The estimated OAT may be based on a detected IAT. The term report(s) may refer to generating a report signal and/or storing report information in memory, such as in the memory 267. A report signal may indicate a pass or a failure associated with the OAT sensor 108.

At 276, the performance reporting module 206 determines whether the engine OFF count 210 is greater than or equal to a predetermined engine OFF count minimum EOCM 277 based on the OFF time signal OFFTIME 263. If the engine OFF count 210 is greater than or equal to the predetermined engine OFF count minimum EOCM 277 task 278 is performed, otherwise task 252 is performed. At 278, the performance reporting module 206 reports an OAT performance failure, which may be stored in the memory 267. The OAT performance signal OATPERF 275 may indicate the OAT performance failure. This indicates that the OAT signal 106 is skewed high or low relative to an estimated OAT. The estimated OAT may be based on a detected IAT. The test method may end at 280.

At 282, the diagnostic enable module 200 may generate the sensor signals. The sensor signals may include signals from the sensors 108, 182, 186, 192, 175, and/or other sensors of the vehicle control system 100 and/or the OAT diagnostic system 101.

At 286, the diagnostic enable module 200 the diagnostic enable module 200 determines if a disable condition exists based on the sensor signals, as at task 256. Task 283 is performed when a disable condition does not exist. At 283, the engine monitoring module 202 determines whether the engine 110 is running, as at task 258. Task 290 is performed when the engine is not running, otherwise task 292 is performed.

At 290, the engine monitoring module 202 resets the engine running (ON) count 212 to zero. At 292, the engine monitoring module 202 determines an ON count adjustment value ADJUST 293 based on the vehicle speed Vspd 257 and the MAF signal MAF 187. The engine monitoring module 202 may determine the ON count adjustment value ADJUST 293 using a table or algorithm stored in the memory 267.

At 294, the engine monitoring module 202 increments or decrements the engine ON count 212 based on the ON count adjustment value ADJUST 293. As an example, the engine ON count 212 may be decremented when the engine is running, but the vehicle speed Vspd 257 is 0. The engine ON count 212 may be indicated via an ON time signal ONTIME 295.

At 296, the engine monitoring module 202 determines whether the engine ON count is greater than or equal to a predetermined running threshold. Task 298 is performed when the engine ON count is greater than or equal to the running threshold, otherwise task 282 is performed.

At 298, the ambient temperature monitoring module 208 may calculate the differences DIFF3 and DIFF4. The differences may be determined using equations 3 and 4. At 300, the performance reporting module 206 determines (i) whether the third difference DIFF3 is less than or equal to the third maximum MAX3 and (ii) whether the fourth difference DIFF4 is less than or equal to the fourth difference DIFF4. Task 302 is performed when the third difference DIFF3 is less than or equal to the third maximum MAX3 and (ii) the fourth difference DIFF4 is less than or equal to the fourth difference DIFF4, otherwise task 304 is performed.

At 302, the performance reporting module 206 reports an OAT performance pass, which may be stored in the memory 267. This indicates that the OAT signal 106 is not skewed high or low relative to an estimated OAT. At 304, the performance reporting module 206 determines whether the engine ON count 212 is greater than or equal to a predetermined engine running count minimum ERCM 303 based on the ON time signal ONTIME 295. Task 306 is performed when the engine ON count 212 is greater than or equal to the predetermined engine running count minimum ERCM 303, otherwise task 282 is performed. This indicates that the OAT signal 106 is skewed high or low.

At 306, the performance reporting module 206 reports an OAT performance failure, which may be stored in the memory 267. This indicates that the OAT signal 106 is skewed high or low relative to an estimated OAT. The test method may end at 308.

The OAT diagnostic control module 104 may further include an out-of-range high and low (high/low) module 310, an out-of-range monitoring module 312, a sample count module 314, a pass and fail count module 316, and a pass and fail module 318. The pass and fail count module 316 may store a high pass count 320, a low pass count 322, a high fail count 324 and a low fail count 326. The pass and fail count module 316 generates (i) a pass count PASSCOUNT signal 328 that indicates the high pass count 320 and the low pass count 322 and (ii) a fail count FAILCOUNT signal 329 that indicates the high fail count 324 and the low fail count 326. The sample count module 314 stores a sample count 331 and may generate a sample signal SAMPLE 330. The sample signal SAMPLE 320 indicates the sample count 331.

Figure 4:
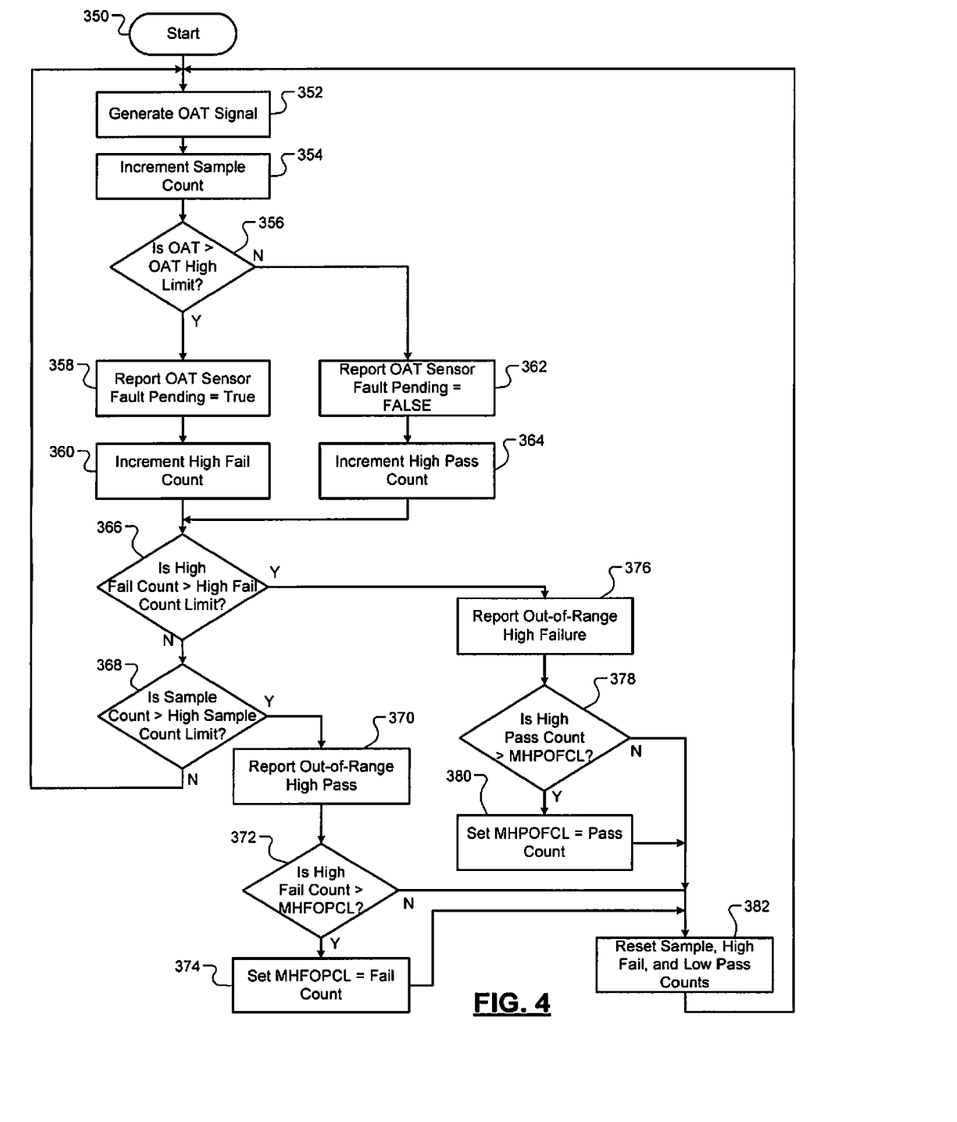
FIG. 4 illustrates an out-of-range high test method in accordance with the present disclosure.

In FIG. 4, an out-of-range high test method is shown. Although the following tasks are primarily described with respect to the implementations of FIGS. 1 and 2, the tasks may be easily modified to apply to other implementations of the present disclosure. The tasks may be iteratively performed and may begin at 350. At 350, counts may be initialized or reset. For example, the high pass count 320, the high fail count 324 and the sample count 331 may be reset to 0.

At 352, the OAT sensor 108 generates the OAT signal OAT 106. At 354, the sample count module 314 increments the sample count 331.

At 356, the out-of-range high and low module 310 determines whether the OAT signal OAT 106 (e.g., resistance of the OAT sensor 108) is greater than a predetermined out-of-range high limit 357. Task 358 is performed when the OAT signal OAT 106 is greater than the predetermined out-of-range high limit 357, otherwise task 362 is performed.

At 358, the out-of-range high and low module 310 may report that an OAT sensor fault is pending. This may be indicted via a first fault pending signal FTPEND1 359. At 360, the pass and fail count module 316 may increment the high fail count 324 based on the report that the OAT sensor fault is pending.

At 362, the out-of-range high and low module 310 may report that an OAT sensor fault is not pending (or that an OAT sensor pass is pending). This may be indicted via the first fault pending signal FTPEND1 359. At 364, the pass and fail count module 316 may increment the high pass count 320 based on the report that the OAT sensor fault is not pending.

At 366, the out-of-range monitoring module 312 determines whether the high fail count 324 is greater than a predetermined high fail count limit OORHFCL 367. Task 376 is performed when the high fail count 324 is greater than the predetermined high fail count limit OORHFCL 367, otherwise task 368 is performed.

At 368, the out-of-range monitoring module 312 determines whether the sample count 331 is greater than a predetermined high sample count limit OORHSCL 369. Task 370 is performed when the sample count 331 is greater than the predetermined high sample count limit OORHSCL 369, otherwise task 352 is performed. Results of tasks 366 and 368 may be provided in an out-of-range high status signal OORHSTAT 371.

At 370, the out-of-range monitoring module 312 reports an out-of-range high pass based on the out-of-range high status signal OORHSTAT 371. This indicates that a circuit of the OAT sensor 108 is not open, shorted to ground, and/or shorted to a source voltage (e.g., a voltage source greater than or equal to 5V).

At 372, the pass and fail module 318 determines whether the high fail count 324 is greater than a maximum high failures on pass count limit MHFOPCL 373. The maximum high failures on pass count limit MHFOPCL 373 is stored in the memory 267 and indicates a maximum number of failures previously experienced when an out-of-range high pass has been reported. If the high fail count 324 is greater than the maximum high failures on pass count limit MHFOPCL 373 than task 374 is performed, otherwise task 382 is performed. At 374, the pass and fail module 318 updates the maximum high failures on pass count limit MHFOPCL 373 with (e.g., set equal to) the high fail count 324. Task 382 is performed subsequent to task 374.

At 376, the out-of-range monitoring module 312 reports an out-of-range high failure based on the out-of-range high status signal OORHSTAT 371. This indicates that a circuit of the OAT sensor 108 is at least one of open, shorted to ground, and/or shorted to a source voltage (e.g., a voltage source greater than or equal to 5V).

At 378, the pass and fail module 318 determines whether the high pass count 320 is greater than a maximum high passes on failure count limit MHPOFCL 379. The maximum high passes on failure count limit MHPOFCL 379 is stored in the memory 267 and indicates a maximum number of passes previously experienced when an out-of-range high failure has been reported. If the high pass count 320 is greater than the maximum high passes on failure count limit MHPOFCL 379 than task 380 is performed, otherwise task 382 is performed. At 380, the pass and fail module 318 updates the maximum high passes on failure count limit MHPOFCL 379 is updated with (e.g., set equal to) the high pass count 320. Task 382 is performed subsequent to task 380.

At 382, the sample count module 314 and the pass and fail count module 316 reset the sample, high pass and high fail counts 320, 324, 331. Task 352 may be performed subsequent to task 382.

Figure 5:
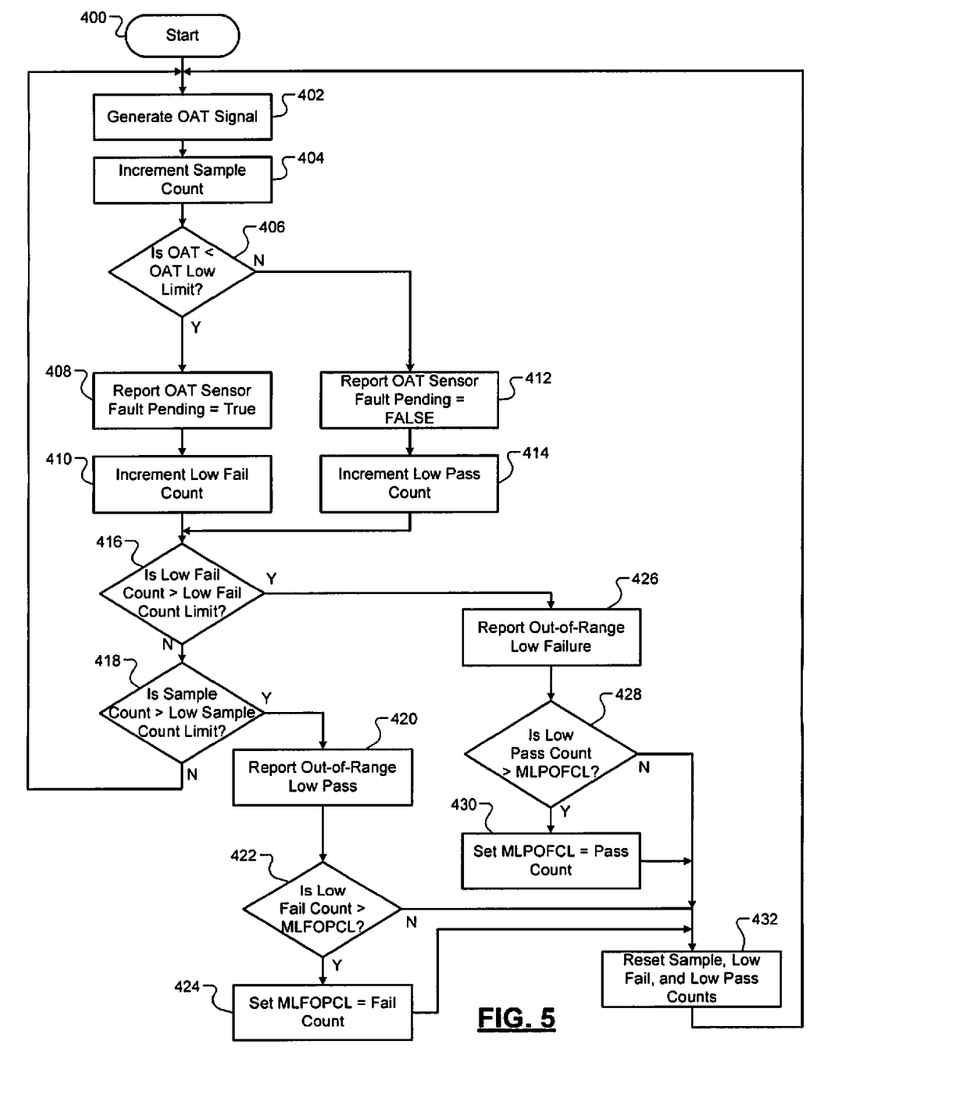
FIG. 5 illustrates an out-of-range low test method in accordance with the present disclosure.

In FIG. 5, illustrates an out-of-range low test method is shown. Although the following tasks are primarily described with respect to the implementations of FIGS. 1 and 2, the tasks may be easily modified to apply to other implementations of the present disclosure. The tasks may be iteratively performed and may begin at 400. At 400, counts may be initialized or reset. For example, the low pass count 322, the low fail count 326 and the sample count 331 may be reset to 0.

At 402, the OAT sensor 108 generates the OAT signal OAT 106. At 404, the sample count module 314 increments the sample count 331.

At 406, the out-of-range high and low module 310 determines whether the OAT signal OAT 106 (e.g., resistance of the OAT sensor 108) is less than a predetermined out-of-range low limit 407. Task 408 is performed when the OAT signal OAT 106 is less than the predetermined out-of-range low limit 407, otherwise task 412 is performed.

At 408, the out-of-range high and low module 310 may report that an OAT sensor fault is pending. This may be indicted via the first fault pending signal FTPEND1 359. At 410, the pass and fail count module 316 may increment the low fail count 326 based on the report that the OAT sensor fault is pending.

At 412, the out-of-range high and low module 310 may report that an OAT sensor fault is not pending (or that an OAT sensor pass is pending). This may be indicted via the first fault pending signal FTPEND1 359. At 414, the pass and fail count module 316 may increment the low pass count 322 based on the report that the OAT sensor fault is not pending.

At 416, the out-of-range monitoring module 312 determines whether the low fail count 326 is greater than a predetermined low fail count limit OORLFCL 417. Task 426 is performed when the low fail count 326 is greater than the predetermined low fail count limit OORLFCL 417, otherwise task 418 is performed.

At 418, the out-of-range monitoring module 312 determines whether the sample count 331 is greater than a predetermined low sample count limit OORLSCL 419. Task 420 is performed when the sample count 331 is greater than the predetermined low sample count limit OORLSCL 419, otherwise task 402 is performed. Results of tasks 416 and 418 may be provided in an out-of-range low status signal OORLSTAT 421.

At 420, the out-of-range monitoring module 312 reports an out-of-range low pass based on the out-of-range low status signal OORLSTAT 421. This indicates that a circuit of the OAT sensor 108 is not open, shorted to ground, and/or shorted to a source voltage (e.g., a voltage source greater than or equal to 5V).

At 422, the pass and fail module 318 determines whether the low fail count 326 is greater than a maximum low failures on pass count limit MLFOPCL 423. The maximum low failures on pass count limit MLFOPCL 423 is stored in the memory 267 and indicates a maximum number of failures previously experienced when an out-of-range low pass has been reported. If the low fail count 326 is greater than the maximum low failures on pass count limit MLFOPCL 423 than task 424 is performed, otherwise task 432 is performed. At 424, the pass and fail module 318 updates the maximum low failures on pass count limit MLFOPCL 423 with (e.g., set equal to) the low fail count 326. Task 432 is performed subsequent to task 424.

At 426, the out-of-range monitoring module 312 reports an out-of-range low failure based on the out-of-range low status signal OORLSTAT 421. This indicates that a circuit of the OAT sensor 108 is at least one of open, shorted to ground, and/or shorted to a source voltage (e.g., a voltage source greater than or equal to 5V).

At 428, the pass and fail module 318 determines whether the low pass count 322 is greater than a maximum low passes on failure count limit MLPOFCL 429. The maximum high passes on failure count limit MLPOFCL 429 is stored in the memory 267 and indicates a maximum number of passes previously experienced when an out-of-range low failure has been reported. If the low pass count 322 is greater than the maximum low passes on failure count limit MLPOFCL 429 than task 430 is performed, otherwise task 432 is performed. At 430, the pass and fail module 318 updates the maximum low passes on failure count limit MLPOFCL 429 is updated with (e.g., set equal to) the low pass count 322. Task 432 is performed subsequent to task 430.

At 432, the sample count module 314 and the pass and fail count module 316 reset the sample, low pass and low fail counts 322, 326 and 331. Task 402 may be performed subsequent to task 432. Although a single sample count 331 is shown, different sample counts may be used for each of the methods of FIGS. 4-6.

The OAT diagnostic control module 104 may further include an absolute value module 450, an intermittent integral module 452, an intermittent count comparison module 454, an intermittent fault module 456, and an intermittent monitoring module 458. The intermittent integral module 452 stores an intermittent (INT) count 460 and generates a corresponding INT count signal INTCOUNT 461. The pass and fail count module 316 may store an intermittent pass count 462 and an intermittent fail count 464.

Figure 6:
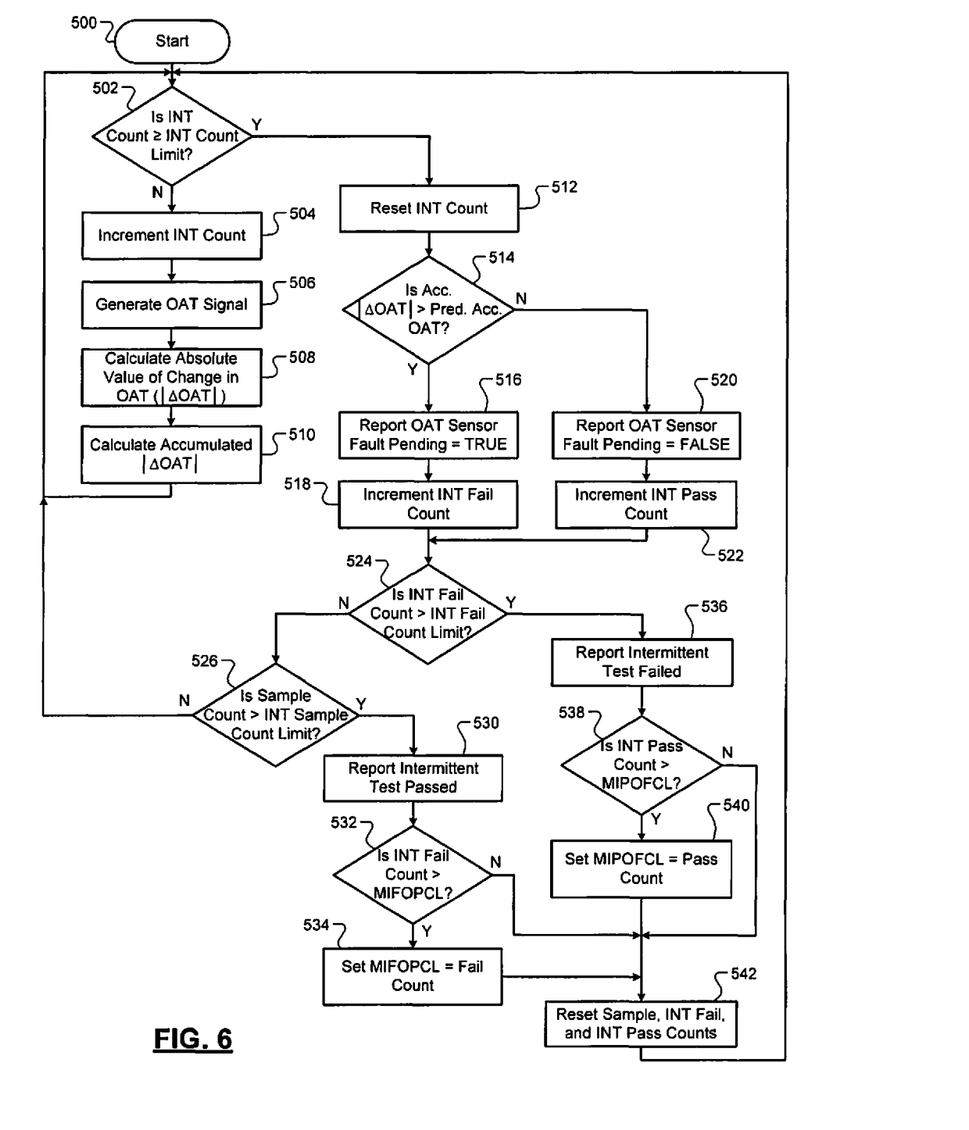
FIG. 6 illustrates an intermittent signal test method in accordance with the present disclosure.

Although different pass count values 320, 322 and 462 are used in the test methods of FIGS. 4-6, a single pass count value may be used and shared among the test methods. Also, although different fail count values 324, 326 and 464 are used in the test methods of FIGS. 4-6, a single fail count value may be used and shared among the test methods.

In FIG. 6, illustrates an intermittent signal test method is shown. The intermittent test method is used to check for abnormally large changes in an indicated OAT and/or abnormally large and frequent variations in detected OATs. This diagnostic integrates (or sums) differences in OAT signals periodically (e.g., every 100 milliseconds) and for a predetermined number of integrations.

Although the following tasks are primarily described with respect to the implementations of FIGS. 1 and 2, the tasks may be easily modified to apply to other implementations of the present disclosure. The tasks may be may be performed within a predetermined period (e.g., 100 milliseconds), iteratively performed based on the predetermined number of integrations, and may begin at 500. At 500, counts may be initialized or reset. For example, the INT count 460, the intermittent pass count 462 and the intermittent fail count 464 may be reset to 0.

At 502, the intermittent count comparison module 454 determines whether the INT count 460 is greater than or equal to a predetermined INT count limit 503. The intermittent count comparison module 454 may generate an INT limit result signal INTRES 505 based on the comparison between the INT count 460 and the predetermined INT count limit 503. Task 512 is performed when the INT count 460 is greater than or equal to the predetermined INT count limit 503, otherwise task 504 is performed.

At 504, the intermittent integral module 452 increments the INT count 460. At 506, the OAT sensor 108 generates the OAT signal OAT 106.

At 508, the intermittent integral module 452 calculates the absolute value of change in OAT between a current OAT and a previously detected OAT (|ΔOAT|). The intermittent integral module 452 generates an absolute value signal ABS 509. At 510, the intermittent integral module 452 calculates the accumulated change in outside air temperature |ΔOAT|. This may include summing a current change in outside air temperature ΔOAT with a previously stored accumulated outside air temperature |ΔOAT|.

At 512, the sample count module 314 increments the sample count 331 based on the INT limit result signal INTRES 505 and resets the INT count 460 to 0. Although a single sample count is shown, different sample count values (e.g., sample count$_1$-sample count$_3$) may be used for the test methods of FIGS. 4-6.

At 514, the intermittent fault module 456 determines whether the accumulated change in outside air temperature |ΔOAT| is greater than a predetermined accumulated OAT 515 and generates a second fault pending signal FTPEND2 517. Task 516 is performed when the accumulated change in outside air temperature |ΔOAT| is greater than the predetermined accumulated OAT 515, otherwise task 520 is performed.

At 516, the intermittent fault module 456 may report that an OAT sensor fault is pending. This may be indicted via the second fault pending signal FTPEND2 517. At 518, the pass and fail count module 316 may increment the INT fail count 464 based on the report that the OAT sensor fault is pending. The INT fail count 464 may be indicated via the fail count signal FAILCOUNT 329.

At 520, the intermittent fault module 456 may report that an OAT sensor fault is not pending (or that an OAT sensor pass is pending). This may be indicted via the second fault pending signal FTPEND2 417. At 522, the pass and fail count module 316 may increment the INT pass count 462 based on the report that the OAT sensor fault is not pending. The INT pass count 462 may be indicated via the pass count signal PASSCOUNT 328.

At 524, the intermittent monitoring module 458 determines whether the INT fail count 464 is greater than a predetermined INT fail count limit IFCL 525. Task 536 is performed when the INT fail count 464 is greater than the predetermined INT fail count limit IFCL 525, otherwise task 526 is performed.

At 526, the intermittent monitoring module 458 determines whether the sample count 331 is greater than a predetermined INT sample count limit ISCL 527. Task 530 is performed when the sample count 331 is greater than the predetermined INT sample count limit ISCL 527, otherwise task 502 is performed. The intermittent monitoring module 458 may generate an INT status signal INTSTAT 529 based on results of tasks 524 and 526.

At 530, the intermittent monitoring module 458 reports an INT pass based on the INT status signal INTSTAT 529. This indicates that an OAT signal from the OAT sensor 108 is stable.

At 532, the pass and fail module 318 determines whether the INT fail count 464 is greater than a maximum INT failures on pass count limit MIFOPCL 533. The maximum INT failures on pass count limit MIFOPCL 533 is stored in the memory 267 and indicates a maximum number of failures previously experienced when an INT pass has been reported. If the INT fail count 464 is greater than the maximum INT failures on pass count limit MIFOPCL 533 than task 534 is performed, otherwise task 542 is performed. At 534, the pass and fail module 318 updates the maximum INT failures on pass count limit MIFOPCL 533 with (e.g., set equal to) the INT fail count 464.

At 536, the intermittent monitoring module 458 reports an INT failure INT status signal INTSTAT 529. This indicates that an OAT signal from the OAT sensor 108 is unstable.

At 538, the pass and fail module 318 determines whether the INT pass count 462 is greater than a maximum INT passes on failure count limit MIPOFCL 539. The maximum INT passes on failure count limit MIPOFCL 539 is stored in the memory 267 and indicates a maximum number of passes previously experienced when an INT failure has been reported. If the INT pass count 462 is greater than the maximum INT passes on failure count limit MIPOFCL 539 than task 540 is performed, otherwise task 542 is performed. At 540, the pass and fail module 318 updates the maximum INT passes on failure count limit MIPOFCL 539 is updated with (e.g., set equal to) the INT pass count 462.

At 542, the sample count module 314 and the pass and fail count module 316 reset the sample, INT pass and INT fail counts 331, 462, 464. Task 502 may be performed subsequent to task 542.

The above-described tasks of FIGS. 3A-6 are meant to be illustrative examples; the tasks may be performed sequentially, synchronously, simultaneously, continuously, during overlapping time periods or in a different order depending upon the application.

Also, the above-described test methods may be performed sequentially, synchronously, continuously, and/or during overlapping time periods. The above-described test methods allow OAT information to be OBD compliant. This improves robustness and performance of OBD dependent vehicle systems, allows for improved in-use-rates of OAT diagnostics, and provides false pass and false failure reporting (figure-of-merit data).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An outside air temperature (OAT) diagnostic system comprising:
an ambient temperature monitoring module that receives (i) an OAT signal from an OAT sensor and (ii) an intake air temperature (IAT) signal from an IAT sensor of an engine,
wherein the ambient temperature monitoring module compares the OAT signal to the IAT signal and generates a first difference signal;
a diagnostic module that generates a second difference signal based on at least one of (i) a comparison between the OAT signal and the IAT signal, and (ii) a comparison between an engine coolant temperature signal and the IAT signal; and
a performance reporting module that determines, based on the first difference signal and the second difference signal, whether the OAT sensor is exhibiting a fault and generates an OAT performance signal.

2. The OAT diagnostic system of claim 1, wherein:
the ambient temperature monitoring module subtracts the IAT signal from the OAT signal to generate the first difference signal; and
the ambient temperature monitoring module subtracts the OAT signal from the IAT signal to generate the second differences signal.

3. The OAT diagnostic system of claim 1, wherein the diagnostic module generates the second difference signal based on the engine coolant temperature signal and the IAT signal, and wherein the performance reporting module determines whether the OAT sensor is exhibiting a fault and generates the OAT performance signal:
based on the first difference signal and the second difference signal when the engine is deactivated; and
based on the second difference signal and not the first difference signal when the engine is activated.

4. An outside air temperature (OAT) diagnostic system comprising:
an ambient temperature monitoring module that receives (i) an OAT signal from an OAT sensor and (ii) an intake air temperature (IAT) signal from an IAT sensor of an engine,
wherein the ambient temperature monitoring module compares the OAT signal to the IAT signal and generates a difference signal;
an engine monitoring module that determines whether the engine is activated and stores an engine OFF count and an engine ON count based on whether the engine is activated; and
a performance reporting module that determines, based on the difference signal, the engine OFF count and the engine ON count, whether the OAT sensor is exhibiting a fault and generates the OAT performance signal.

5. An outside air temperature (OAT) diagnostic system comprising:
an ambient temperature monitoring module that receives (i) an OAT signal from an OAT sensor and (ii) an intake air temperature (IAT) signal from an IAT sensor of an engine,
wherein the ambient temperature monitoring module compares the OAT signal to the IAT signal and generates a difference signal; and
a performance reporting module that determines, based on the difference signal, whether the OAT sensor is exhibiting a fault and generates an OAT performance signal, wherein the performance reporting module determines that the OAT signal is skewed one of high and low relative to an estimated OAT based on the difference signal.

6. An outside air temperature (OAT) diagnostic system comprising:
an ambient temperature monitoring module that receives (i) an OAT signal from an OAT sensor and (ii) an intake air temperature (IAT) signal from an IAT sensor of an engine, wherein the ambient temperature monitoring module compares the OAT signal to the IAT signal and generates a difference signal;

at least one of (i) an out-of-range high and low module that generates a first fault pending signal based on the OAT signal and an OAT limit and (ii) an intermittent fault module that generates a second fault pending signal based on an intermittent count and an intermittent limit;

a count module that increments one of a first pass count and a first fail count based on at least one of the first fault pending signal and the second fault pending signal; and a diagnostic module that (i) determines whether the OAT sensor is exhibiting a fault based on the difference signal and at least one of the first pass count and the first fail count, and (ii) generates an OAT performance signal.

7. The OAT diagnostic system of claim 6, further comprising a pass and fail module that:

stores (i) a maximum fail on pass count limit and (ii) a maximum pass on fail count limit; and performs one of (i) a first comparison between the fail count and the maximum fail on pass count limit and (ii) a second comparison between the pass count and the maximum pass on fail count limit, wherein the count module resets the fail count and the pass count based on the first comparison and the second comparison.

8. The OAT diagnostic system of claim 6, further comprising:

a count comparison module that compares the intermittent count to an intermittent limit and generates a limit result signal; and a sample count module that stores a sample count based on the limit result signal, wherein the intermittent fault module generates the second fault pending signal based on the intermittent count and an intermittent maximum, wherein the count module increments one of the first pass count and the first fail count based on the second fault pending signal, wherein the diagnostic module determines whether the OAT sensor is exhibiting a fault based on the sample count, an intermittent fail count limit, and a sample count limit, and wherein the diagnostic module determines whether the OAT sensor is exhibiting a fault based on (i) a first comparison between the sample count and the sample count limit and (ii) a second comparison between the fail count and the fail count limit.

9. The OAT diagnostic system of claim 6, further comprising a pass and fail module that:

stores (i) a fail on pass count limit and (ii) a pass on fail count limit;

performs (i) a first comparison between the first fail count and the fail on pass count limit and (ii) a second comparison between the first pass count and the pass on fail count limit;

performs the first comparison when the OAT sensor is not exhibiting a fault; and performs the second comparison when the OAT sensor is exhibiting a fault, wherein the count module resets the first fail count and the first pass count based on the first comparison and the second comparison.

10. The OAT diagnostic system of claim 6, further comprising a pass and fail module that:

compares the first fail count for the OAT sensor to a fail count limit;

compares the first pass count for the OAT sensor to a pass on fail count limit in response to the first fail count being greater than the fail count limit, wherein count module increments the first pass count or the first fail count based on the second fault pending signal; and sets the pass on fail count limit equal to the first pass count when the first pass count is greater than the maximum pass on fail count limit, wherein the count module resets the first pass count and the first fail count subsequent to setting the pass on fail count limit equal to the first pass count.

11. The OAT diagnostic system of claim 6, further comprising a pass and fail module that compares the first fail count for the OAT sensor to a fail count limit, wherein:

the count module compares a sample count of the OAT signal to sample count limit when the first fail count is greater than the fail count limit;

the pass and fail module compares the first fail count to a fail on pass count limit in response to the sample count being greater than the sample count limit, wherein count module increments the first pass count or the first fail count based on the second fault pending signal; and sets the fail on pass count limit equal to the first fail count when the first fail count is greater than the fail on pass count limit, wherein the count module resets the first pass count and the first fail count subsequent to setting the fail on pass count limit equal to the first fail count.

12. The OAT diagnostic system of claim 6, wherein:

the out-of-range high and low module generates the first fault pending signal based on the OAT signal and a first OAT limit;

the intermittent fault module generates the second fault pending signal based on the intermittent count and the intermittent limit;

the count module increments one of the first pass count and the first fail count based on the first fault pending signal and the second fault pending signal; and the diagnostic module determines whether the OAT sensor is exhibiting a fault based on the first pass count and the first fail count.

13. The OAT diagnostic system of claim 6, further comprising:

an absolute value module that determines an absolute value of a difference between a current OAT and a pervious OAT, wherein the absolute value module adds the absolute value to the intermittent count;

a comparison module that compares the intermittent count to the intermittent limit and generates a resultant signal; and an integral module that increments the intermittent count based on the resultant signal, and wherein the intermittent fault module generates the second fault pending signal to indicate a fault with the OAT sensor when the intermittent count is greater than a predetermined value, and no fault with the OAT sensor when the intermittent count is less than or equal to the predetermined value.

14. The OAT diagnostic system of claim 6, wherein:

the out-of-range high and low module generates the first fault pending signal based on the OAT signal and the first OAT limit;

the count module increments one of the first pass count and the first fail count based on the first fault pending signal; and the count module determines whether the first fail count is greater than a first fail count limit and generates a first status signal.

15. The OAT diagnostic system of claim 14, wherein a second monitoring module determines whether the OAT sensor has a circuit that is at least one of (i) open, (ii) shorted to ground and (iii) shorted to a source voltage based on the first status signal.

* * * * *